US005367767A

United States Patent [19]

Deuel et al.

[11] Patent Number: 5,367,767

[45] Date of Patent: Nov. 29, 1994

[54] APPARATUS AND METHOD FOR POSITIONING AND FORMING A DRAIN WIRE OF A CABLE

[75] Inventors: Gregory F. Deuel, Manheim; Kenneth F. Folk, Harrisburg, both of Pa.

[73] Assignee: The Whitaker Corporation, Wilmington, Del.

[21] Appl. No.: 34,051

[22] Filed: Mar. 22, 1993

[51] Int. Cl.[5] ........................ H01R 43/00; B23P 23/00

[52] U.S. Cl. ........................................ 29/868; 29/33 F; 29/828; 156/47; 174/36; 174/128.1

[58] Field of Search ............... 29/868, 857, 33 F, 872, 29/828; 156/47; 174/128.1, 36

[56] References Cited

U.S. PATENT DOCUMENTS 3,484,936 12/1969 Schwalm et al. ..................... 29/828
4,866,842 9/1989 Gorjat ............................... 29/828 X
5,133,121 7/1992 Birbeck et al. .................. 29/828 X

FOREIGN PATENT DOCUMENTS 1617463 12/1990 U.S.S.R. ............................... 156/47

*Primary Examiner*—Carl J. Arbes

[57] ABSTRACT

A method and apparatus is disclosed for automatically positioning and forming a drain wire of a cable and then positioning the formed drain wire for automatic termination to a connector. Each cable is in turn rotated until a sensing whisker senses that the drain wire is in a known position. The drain wire is then formed by forming tooling and the cable is again rotated to position the formed drain wire in a desired angular position. A clamping mechanism maintains pressure on all of the cables thereby inhibiting rotation thereof except for the cable that is being processed.

22 Claims, 12 Drawing Sheets

TO A/D CONVERTER
IN CPU
312
RETIFIER
AND
FILTER 310
314
10pF
220K
222
220
300
OP AMP BASED
SINE-WAVE GENERATOR
APPROX. 100K Hz
70
68
66
62

APPARATUS AND METHOD FOR POSITIONING AND FORMING A DRAIN WIRE OF A CABLE

The present invention relates to an automated apparatus for and a method of positioning and forming a drain wire of a cable so that the cable and drain wire may be automatically terminated to an electrical device such as a connector.

BACKGROUND OF THE INVENTION

Coaxial cables having drain wires typically are prepared for termination to electrical devices by manually stripping the end of the cable, then manually locating the drain wire, positioning it, and forming it to the desired shape and position relative to the cable. These cables, which are used in computer backplane wiring, are quite small. Typically they have an outside diameter of about 0.045 inch with the drain wire having a diameter of about 0.009 inch. These small dimensions require that the individual performing the work do so with the aid of a magnifying glass and small delicate tweezers and similar tools. Needless to say, such operations are labor intensive and the quality of the final product is directly related to the skill level of the individual worker. What is needed is a method for doing this work that lends itself to automation and apparatus for carrying out the method.

SUMMARY OF THE INVENTION

An apparatus for and method of positioning and forming a drain wire of a cable by means of an automated machine is disclosed. The machine includes a holder for receiving and holding at least one of the cables so that it can freely rotate about its axis and a clamping apparatus selectively operable to engage the cable thereby inhibiting its free rotation or to disengage the cable thereby permitting the free rotation thereof. The machine also includes a sensing means for sensing the presence of the wire when in a first predetermined position and apparatus for rotating the cable about its axis, when the cable is free to rotate, until the drain wire is in the first predetermined position, Apparatus is provided for forming the drain wire into a desired shape and position with respect to the cable, The method comprises the steps:

(1) placing at least one cable in the holder;

(2) rotating the cable only until the sensing means senses the presence of the drain wire and the drain wire is in the first predetermined position; then (3) forming a portion of the drain wire to a desired shape and position with respect to the cable,

DESCRIPTION OF TEE PREFERRED EMBODIMENT

Figure 1:
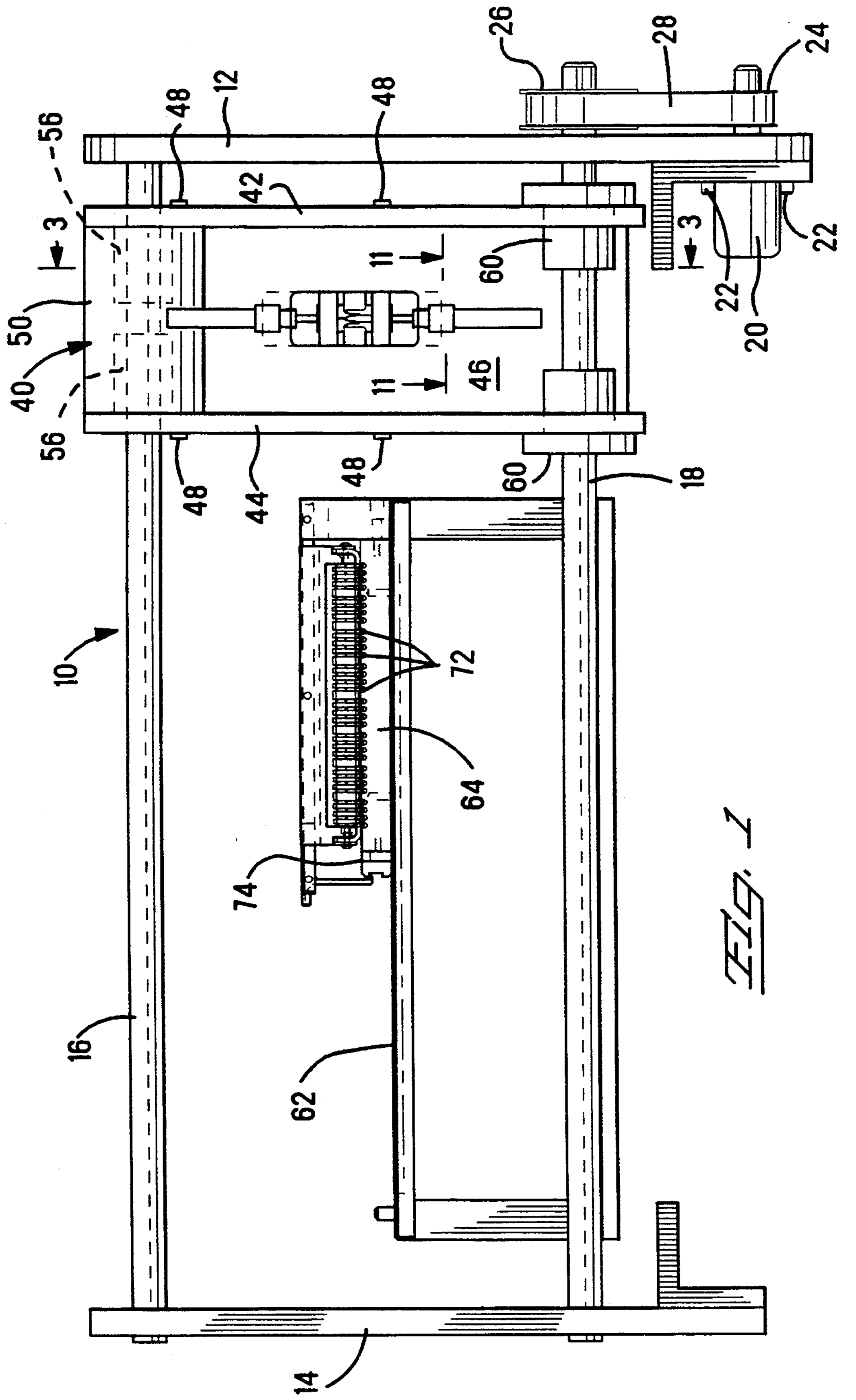
FIG. 1 is a front view of an automated machine incorporating the teachings of the present invention.
Figure 2:
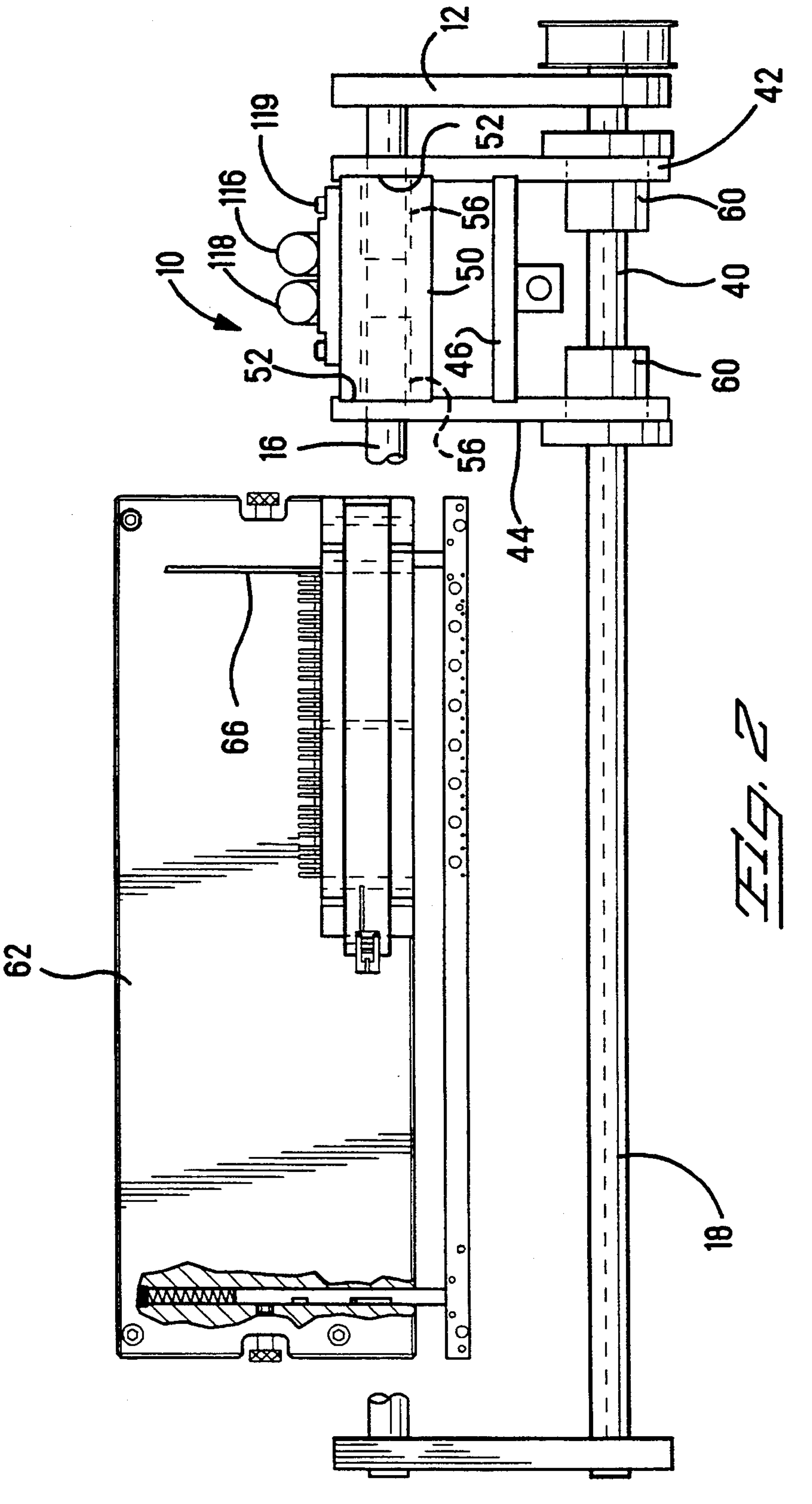
FIG. 2 is a top view of that of FIG. 1.
Figure 3:
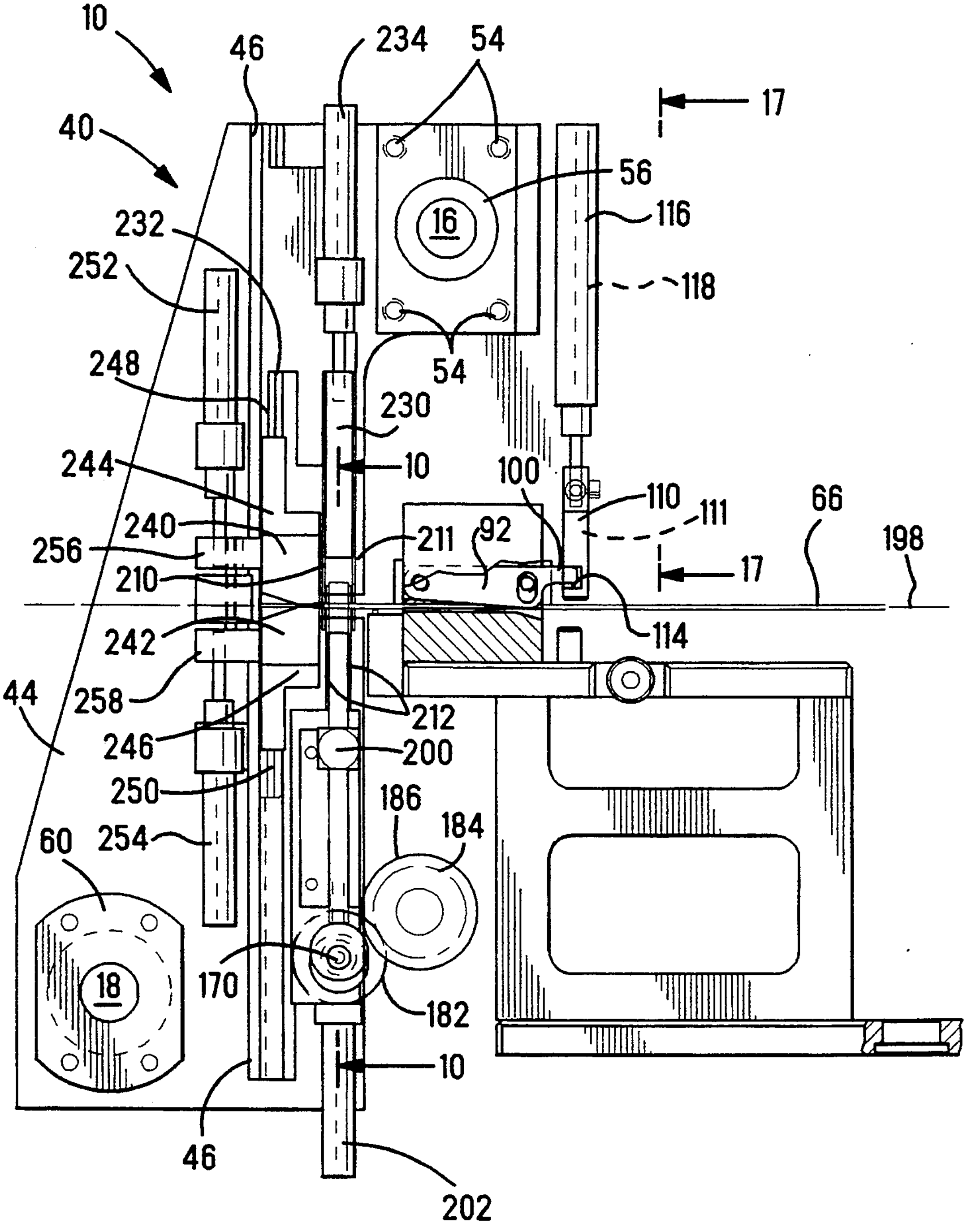
FIG. 3 is an end view of that of FIG. 1.

There is shown in FIGS. 1, 2, and 3 a portion of an automated machine 10 having a pair of spaced frame members 12 and 14 rigidly attached to the machine. A precision bar 16, such as drill rod, spans the two frame members near the top thereof, as viewed in FIG. 1, the bar 16 being rigidly attached to each frame member. A lead screw 18 also spans the two frame members and is vertically below the bar 16, as viewed in FIG. 1, and is laterally to the left, as viewed in FIG. 3. The lead screw 18 is a $\frac{3}{4}$ inch ball screw and is journaled for rotation in the two frame members. A stepping motor 20 is attached to the frame member 12 by means of the screw fasteners 22. A pulley 24 is attached to the shaft of the stepper motor and another pulley 26 is attached to the end of the lead screw 18 in alignment with the pulley 24. A belt 28 rotationally couples the two pulleys together so that the stepper motor can drive the lead screw.

A carriage 40 includes a pair of spaced side plates 42 and 44 and a mounting plate 46 which is attached to edges of the two side plates by means of the screw fasteners 48 to form a rigid frame assembly. A bearing block 50 is set into recesses 52 formed in the two side plates and secured in place by means of the screw fasteners 54. A pair of linear ball bearings 56, which mate with the precision shaft 16, are secured into bores formed in each end of the bearing block, as best seen in FIGS. 1 and 2. These linear ball bearings permit free linear movement of the carriage 40 along the entire length of the shaft 16 between the plates 12 and 14. A pair of flange mounted ball nuts 60 are attached to the two side plates 42 and 44 in the usual manner in mating engagement with the ball lead screw 18. With this arrangement the stepper motor may be operated to cause the carriage to traverse the length of the precision shaft 16 in either direction.

Figure 4:
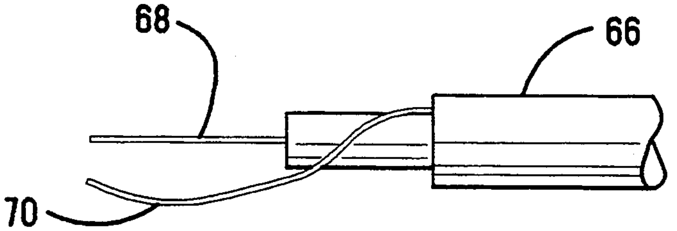
FIG. 4 is schematic representation of a cable having a drain wire.
Figure 5:
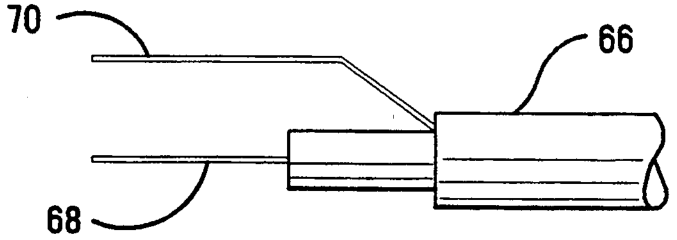
FIG. 5 is similar to FIG. 4 showing the drain wire after forming.
Figure 6:
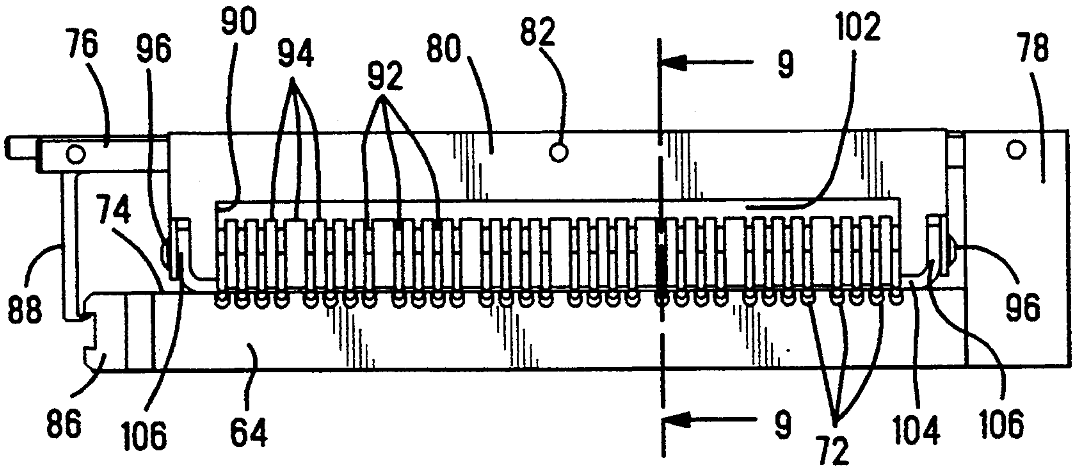
FIG. 6 is a front view of the cable holder and clamp.
Figure 7:
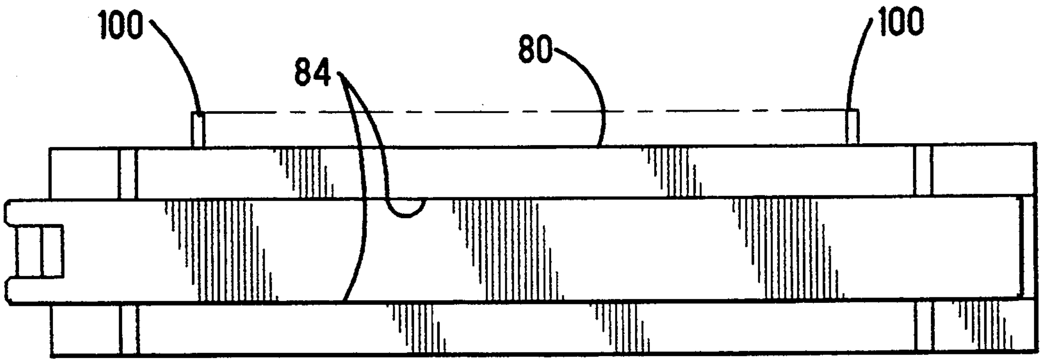
FIG. 7 is a top view of that of FIG. 6.
Figure 8:
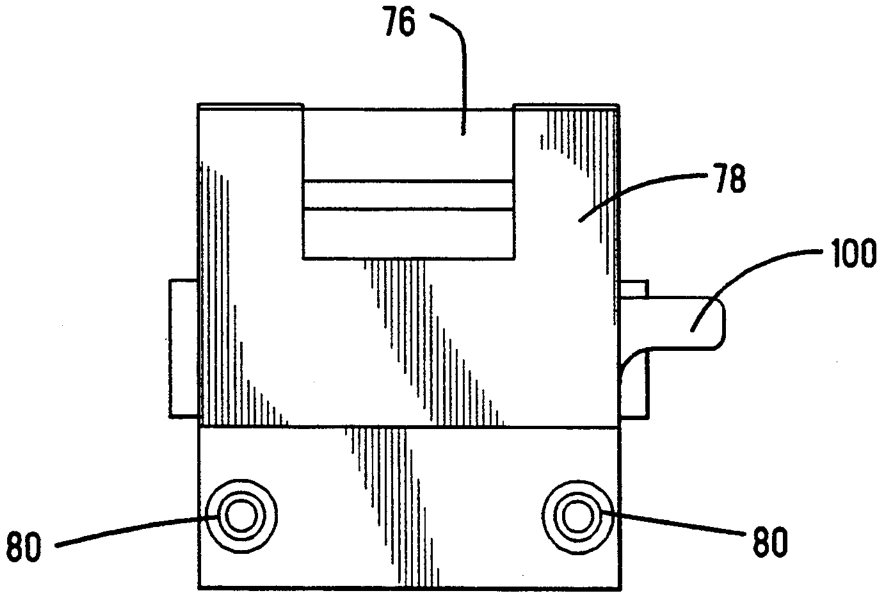
FIG. 8 is an end view of that of FIG. 6.
Figure 9:
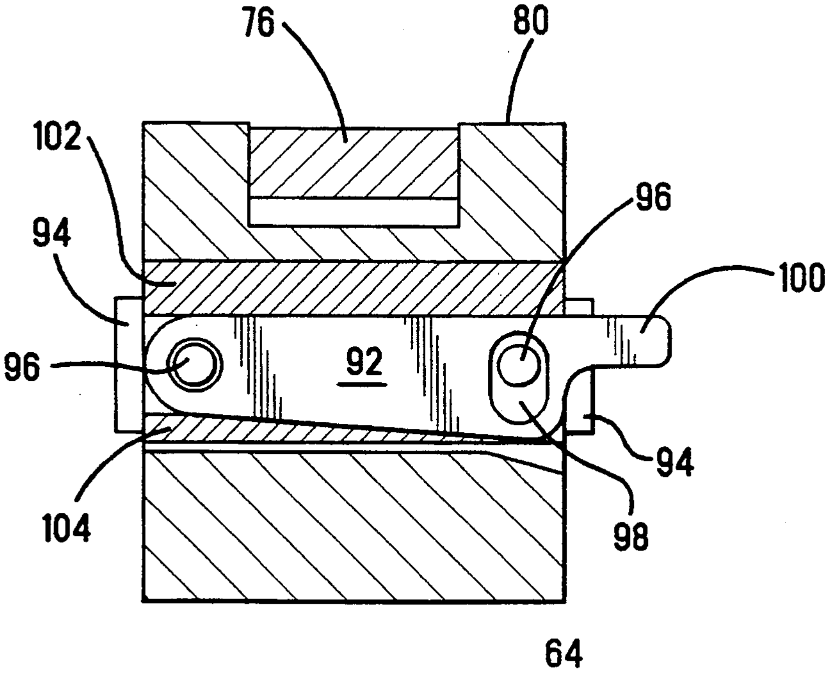
FIG. 9 is a cross-sectional view taken along the lines 9—9 in FIG. 6.

A pallet assembly 62 is removably secured to the machine 10 and is used to position a cable holder 64 which holds and positions the cables during the drain wire forming process. Once the drain wires are formed the pallet assembly with the cables in place is removed from the machine and transported to another work station for termination of the cables to connectors. There is shown in FIGS. 4 and 5 a typical cable 66 having an inner conductor 68 and a helically wound drain wire 70. As shown in FIG. 4 the drain wire extends from the stripped end of the cable in a somewhat unpredictable manner and must be formed and positioned as shown in FIG. 5 prior to termination to a connector. As is shown in FIGS. 1 and 6 the holder 64 includes a plurality of openings 72 which are spaced to correspond to the spacing of the connector terminals to which the cables are to be terminated. The openings 72, being open along the upper edge 74 of the holder 64, are sized to receive the cables 66 and hold them to prevent any substantial lateral movement yet permit free rotation about the axis of the cable. As best seen in FIGS. 6, 7, and 8, a clamp bar 76 is hingedly attached to the holder 64 by means of a hinge 78 which is rigidly attached to the holder with the screw fasteners 80. A clamp fixture 80 is pivotally attached to the clamp bar 76 in its approximate center by the pin 82, the clamp bar being in a recess 84 formed in the clamp fixture. A catch 86 is attached to the end of the holder 64 that is opposite the hinge 78 and a pawl 88, pivotally attached to the clamp bar 76, is arranged to engage the catch and lock the clamp bar in position adjacent the surface 74, as shown in FIGS. 1 and 6. The clamp fixture 80 has a cutout 90 within which a plurality of clamping members 92 and associated spacers 94 are arranged so that each clamping member is vertically above a respective one of the openings 72 in the holder 64. The spacers 94 and clamping member 92 are retained within the cutout 90 by means of two rods 96 which extend completely through openings in the spacers and clamping members and are secured to each end of the clamp fixture 80. One of the openings in each of the clamping members is an elongated opening 98 to permit some limited movement of the end of the clamping member toward and away from the openings 72 in the holder 64. A dog 100 projects from that end of each of the clamping members, as best seen in FIGS. 7, 8, and 9, for a purpose that will be explained below. A strip 102 of resilient material is arranged within the cutout 90 above the clamping members 92 and against the clamp fixture 80. Another strip 104 of resilient material is arranged to span the cutout 90 and is attached to each end of the clamp fixture as indicated at 106. The strip 104 is thereby positioned between the clamping members 92 and the openings 72 in the holder 64 when the clamp bar 76 is latched in place by the pawl 88. As the clamp bar is latched, the strip 102 pushes against each of the clamping members 92 causing them to force the strip 104 to elastically deform into the openings 72 and into pressing engagement with the cables 66. This inhibits rotation of the cables. The space between the bottom of the openings 72 and the adjacent surface of the strip 104 is chosen so that a cable 66 that is within the opening 72 is free to rotate about its axis when the dog 100 is lifted enough to permit the strip 104 to withdraw from the opening 72. In the present example the two resilient strips are made of urethane, however, other suitable resilient material may be used.

Figure 17:
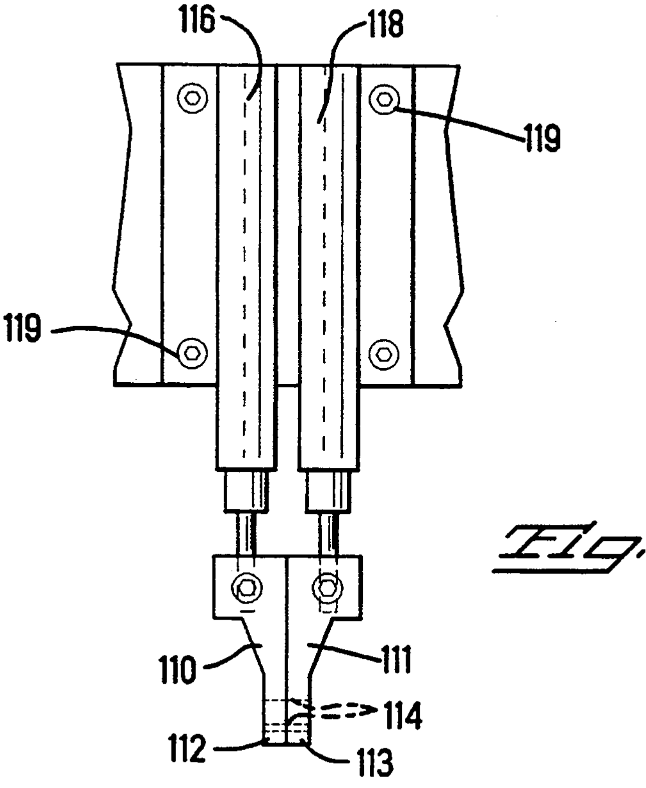
FIG. 17 is a partial view taken along the lines 17—17 of FIG. 3.

The clamping members 92 are actuated by the mechanism shown in FIGS. 3 and 17. There a pair of actuating bars 110 and 111 are arranged closely adjacent to each other and have ends 112 and 113 respectively. The ends 112 and 113 each have a width that is about the same as that of the clamping members 92, and a notch 114 formed in the edge facing the clamping members 92 and sized to loosely receive the dogs 100. The ends 112 and 113 are spaced to match the lateral spacing of the clamping members 92. A pair of linear actuators 116, 118 are secured to the bearing block 50 by means of the screw fasteners 119, as shown in FIGS. 2, 3, and 17. The piston rods of the two cylinders are attached to the actuating bars 110 and 111 as shown. When the cylinder 116 is retracted, the end 112 lifts the dog 100, that it is in alignment with, thereby permitting the strip 104 to withdraw from the opening 72 thereby releasing the cable so that it is free to rotate. The cylinder 118 functions similarly with the end 113 and the adjacent dog 100.

Figure 10:
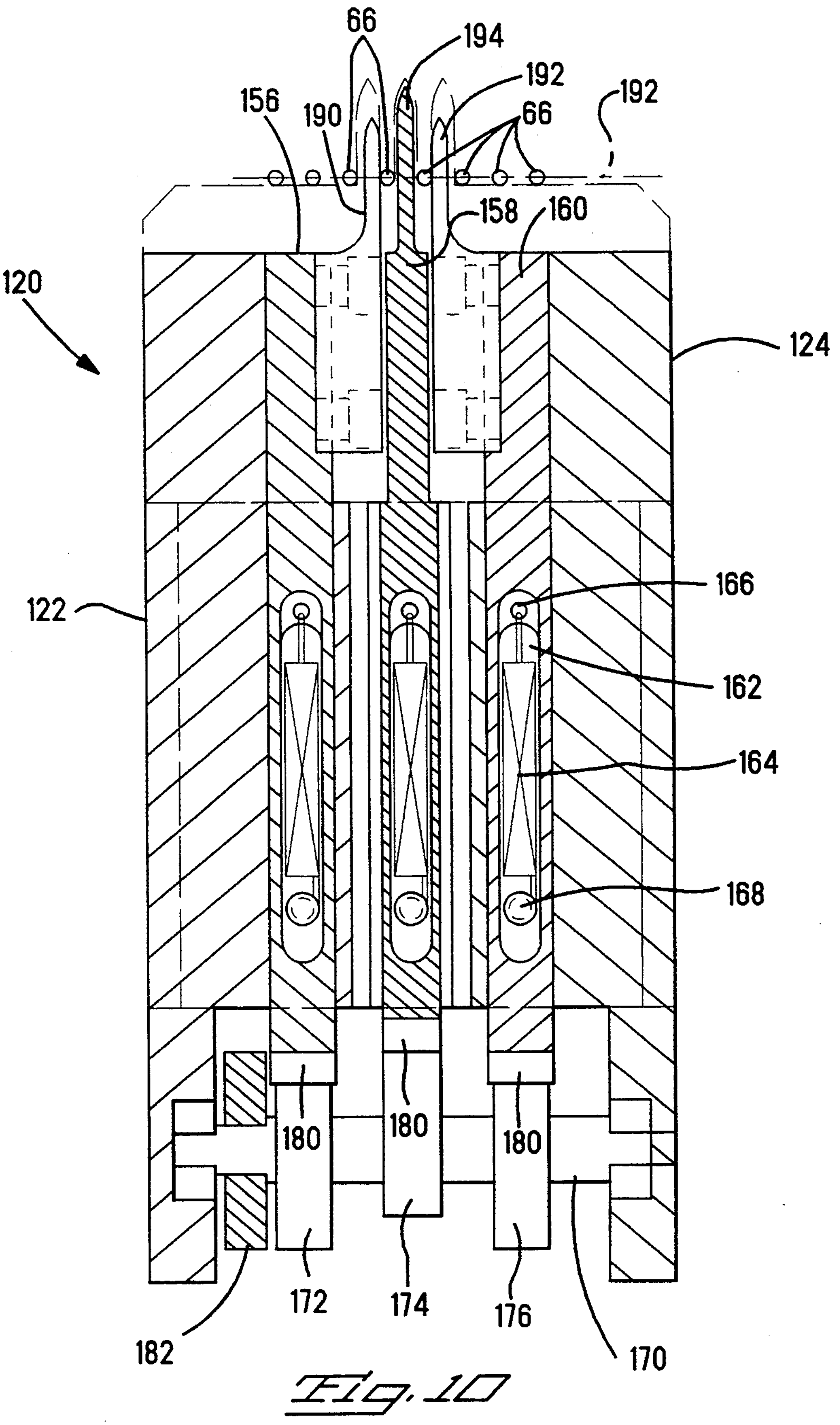
FIG. 10 is a partial cross-sectional view taken along the lines 10—10 in FIG. 3.
Figure 11:
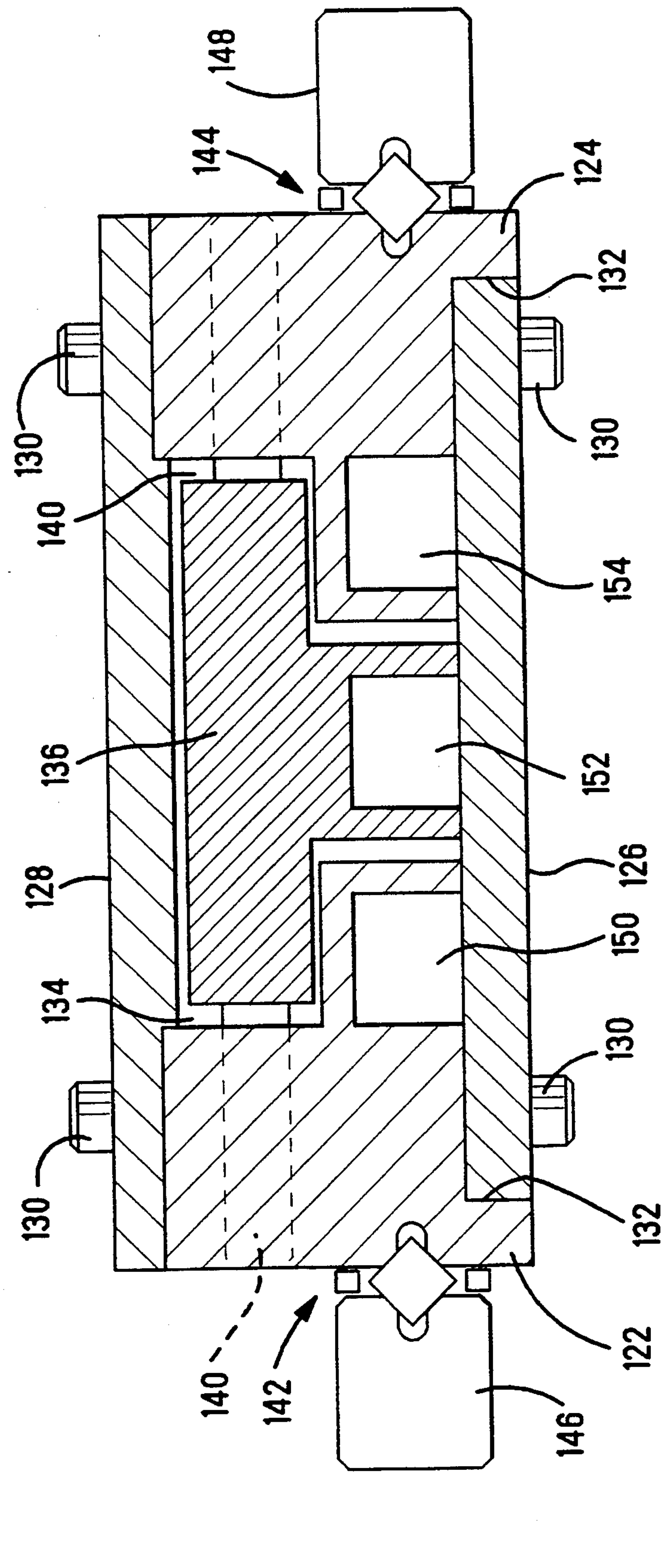
FIG. 11 is a partial cross-sectional view taken along the lines 11—11 in FIG. 1.

There is shown in FIG. 10 a partial cross-sectional view of the cable rotation mechanism 120 taken along the lines 10—10 in FIG. 3. This mechanism will be discussed in light of FIG. 10 as well as FIG. 11 which shows a partial cross-sectional top view of the same mechanism taken along the lines 11—11 in FIG. 1. The mechanism 120 includes left and right side members 122 and 124 and front and back plates 126 and 128 which are secured to the side members by means of the screw fasteners 130, as shown, to form a rigid box-like assembly. The front plate 126 is set into a recess 132 formed in each of the side members 122 and 124 to increase the rigidity of the assembly. The side members are L-shaped and spaced apart to form a T-shaped cavity 134 within the box-like assembly. A T-shaped slide member 136 is arranged within the cavity 134 to slide laterally toward and away from each of the side members 122 and 124 along a pair of pins 140 that are secured to the two side members. The box-like assembly is arranged to undergo linear sliding motion with respect to the carriage 40 in the vertical direction, as viewed in FIGS. 1 and 3. To accomplish this the side members are the movable portions of a pair of slides 142 and 144 having stationary portions 146 and 148. The stationary portions 146 and 148 are attached to the mounting plate 46. Each of the two side members 122 and 124 and the T-shaped slide member 136 have mutually parallel slots 150, 152, and 154 formed therein for receiving and guiding reciprocating bars 156, 158, and 160 respectively. Each of the bars is free to reciprocate vertically within their respective slots without appreciable lateral movement. Each bar includes an elongated opening 162 within which a resilient member 164, an extension spring in the present example, is positioned. Each spring 164 is attached at one end to its respective bar as shown at 166 and at the other end to a pin 168 pressed into the front plate 126 in position within each elongated opening. A cam shaft 170 is journaled for rotation in the two side members 122 and 124 as best seen in FIG. 10. The cam shaft includes three cam lobes 172, 174, and 176, the lobes 172 and 176 being in phase while the lobe 174 is 180 degrees out of phase with the other two. The cam lobes 172, 174, and 176 are in vertical alignment with the slots 150, 152, and 154 respectively so that rotation of the cam shaft 170 will cause the bars 156, 158, and 160 to undergo reciprocating motion. The springs 164 are arranged to urge their respective bars into operational engagement with their respective cam lobes. In the present example each bar has a wear pad 180 attached to the end that engages the cam lob in the usual manner. A gear 182 is secured to the cam shaft and is arranged to mesh with a mating gear 184 that is secured to the shaft of a stepper motor 186. The-stepper motor is mounted to the front plate 126 by any suitable means. The two reciprocating bars 156 and 160 each have cable engaging finger 190 and 192 respectively attached thereto. The center reciprocating bar 158 has a cable engaging finger 194 formed directly on its end as shown. As can be seen in FIG. 10 the cable engaging fingers 190, 192, and 194 have relatively thin elongated portions that project about one half their length through and above the center line 198 of the plurality of cables 66. The fingers are sized and spaced so that they fit between the individual cables as shown when the T-shaped slide member and its associated reciprocating bar 158 are in their center position. The slide member 136 is movable along the pair of pins 140 from its center position to a left position where the finger 194 engages a cable 66 and lightly urges it against the finger 190 and to a right position where the finger 194 engages another cable 66 and lightly urges it against the finger 192. When the center finger 194 engages one of the cables and urges it against either of the fingers 190 or 192 during reciprocating movement of the bars 156, 158, and 160, the cable will rotate in one direction or the other. The stepper motor 186 will control the direction and amount of rotation. When the slide member 136 is in its center position, there will be substantially no contact between the fingers 190, 192, and 194 and the cables 66. A linear actuator 200, an air cylinder in the present example, is attached to the front plate 126 by any suitable means and has its piston rod attached to the T-shaped slide member 136 at a point not shown. The actuator 200 is controllable to move the slide member 136 along the pins 140 to each of its three positions, left, center, and right. Another linear actuator 202, an air cylinder in the present example, is attached to the mounting plate 46 by any suitable means and has its piston rod attached to the front plate 126 and serves to move the cable rotation mechanism 120 upwardly with respect to the center line 198 to the position shown in FIG. 10. The actuator 202 may withdraw the mechanism will below the center line to eliminate the possibility of interference with the cables when the carriage 40 traverses the precision bar 16.

Figure 12:
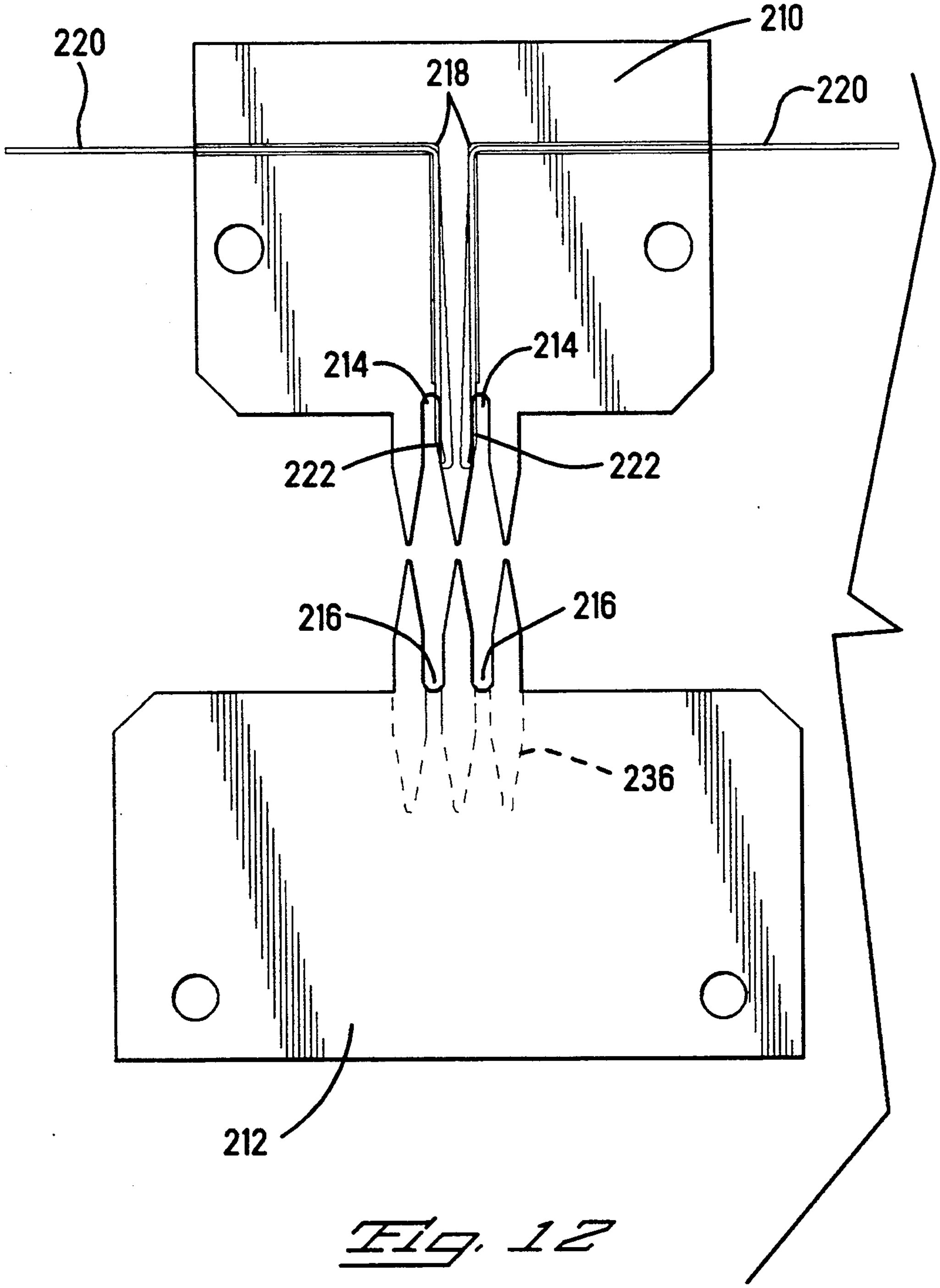
FIG. 12 is a front view of the upper and lower guide members.

There is shown in FIG. 12 an upper cable guide 210 and a lower cable guide 212, each having three tapered fingers that project toward each other and in mutual alignment as shown. The upper cable guide is made of a non-conductive material for a purpose that will be explained below. The fingers are spaced so that there are two openings 214 in the upper guide and two openings 216 in the lower guide, as shown in FIG. 12. The openings 214 and 216 are just wide enough to receive the cables 66 without interference. A pair of L-shaped slots 218 are formed in the surface of the upper guide 210 and contain a pair of sensing whiskers 220. The sensing whiskers 220 are made of piano wire and are resilient. The slots 220 are arranged so that they intersect the openings 214. With the sensing whiskers in place, their lower ends 222 encroach a small amount into the openings 214. There is sufficient clearance in the slots 218 so that when a cable enters either of the openings 214, the corresponding sensor whisker is easily pushed back into the clearance area by the cable but is resilient enough to return to its original position when the cable is removed. In the present example two upper guides and two lower guides are used, the two lower guides being identical but the second upper guide 211 not having either the slots 218 or the sensing whiskers 220. The two lower guides 212 are attached to the two side member 122 and 124 so that they are positioned on each side of the cable engaging fingers 190, 192, and 194. The fingers of the lower guide 212 project: above the center line 198 of the cables with two of the cables 66 nestled in the bottoms of the openings 216 when the cable rotating mechanism 120 is in its raised position as shown in FIG. 10. The two lower guides retract out of the way along with the mechanism 120 when it is retracted. The upper guides 210 and 211 are attached to either side of a carrier bar 230, which is attached to the movable portion of a slide 232, the stationary portion being attached to the mounting plate 46, as best seen in FIG. 3. A linear actuator 234, an air cylinder in the present example, is attached to the mounting plate 46 by any suitable means, has its piston rod attached to the carrier bar 230 so that when the actuator is extended the upper guides 210 and 211 are lowered to the position shown in phantom lines at 236 in FIG. 12. Note that in this position the two upper guides 210 and 211 overlap the outside of the two lower guides 212.

Figure 14:
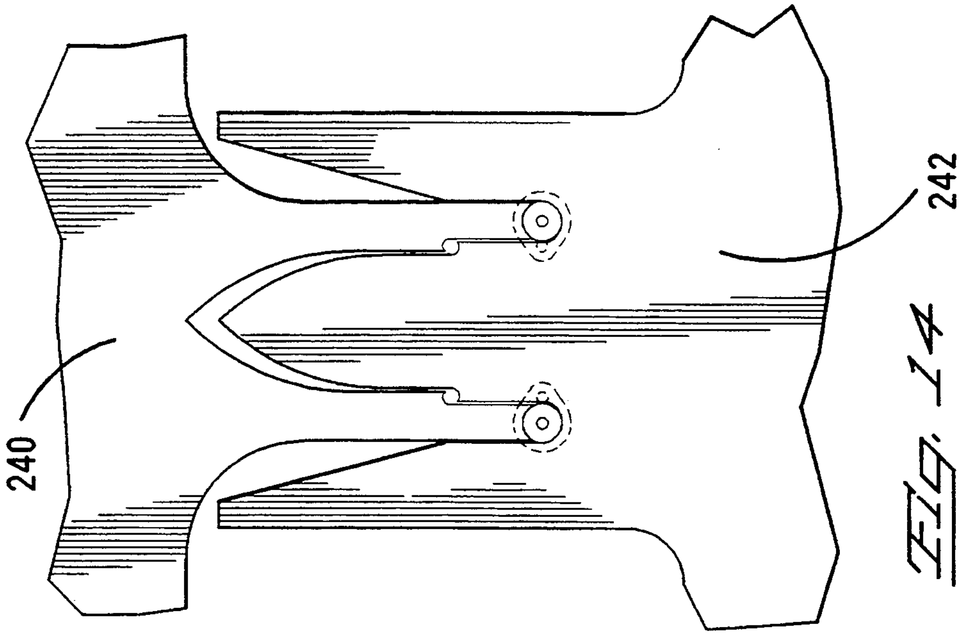
FIG. 14 is a front view of the forming tooling in a partially engaged position.
Figure 13:
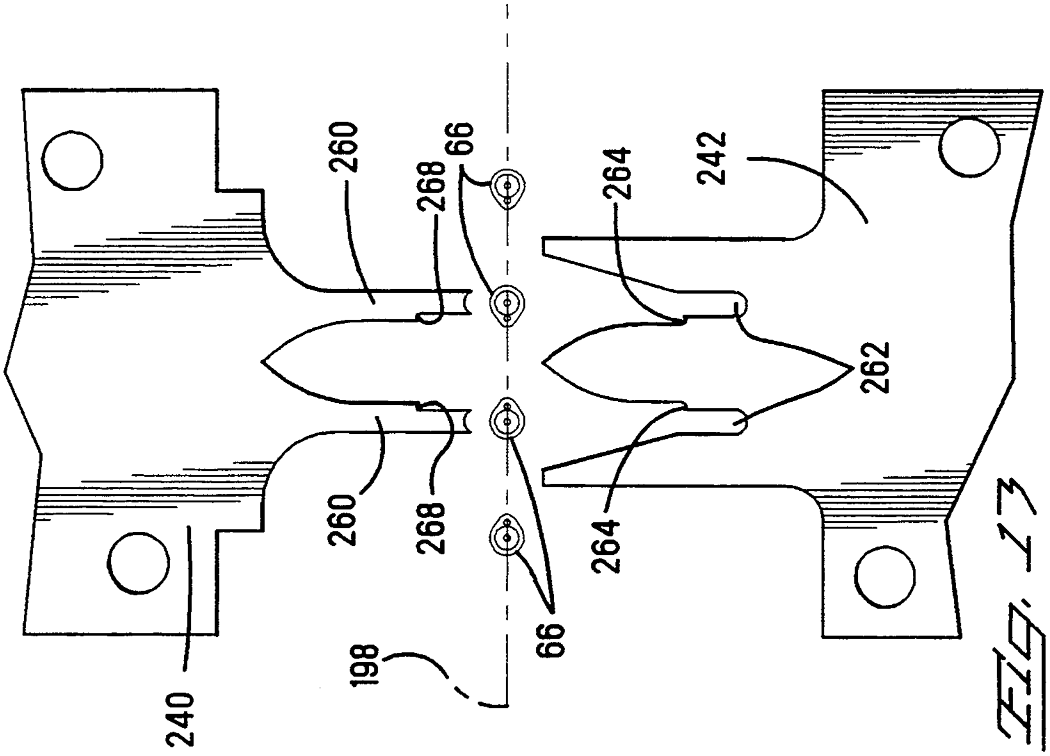
FIG. 13 is a front view of the forming tooling in its withdrawn position.
Figure 16:
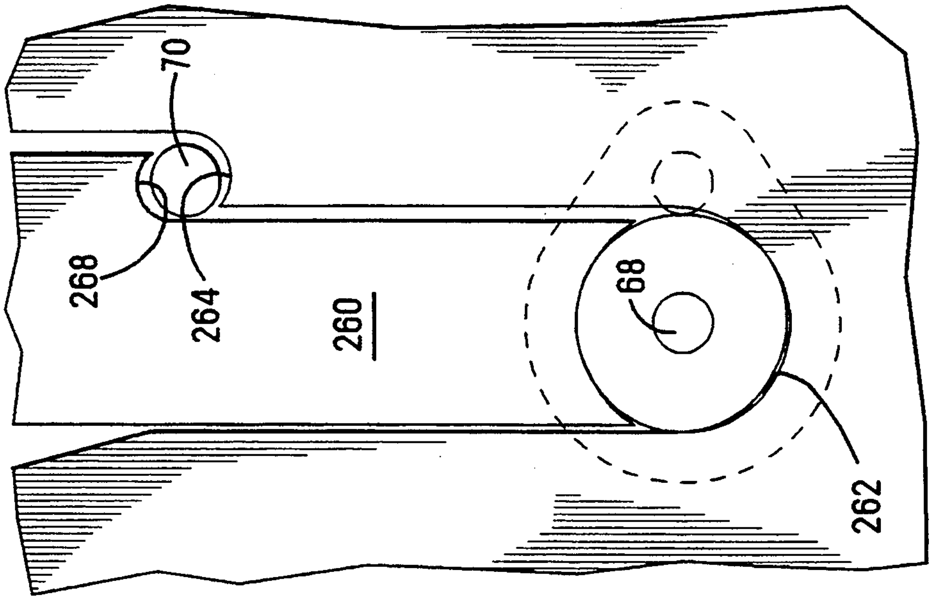
FIG. 16 is an enlarged view of the area 266 of FIG. 15.
Figure 15:
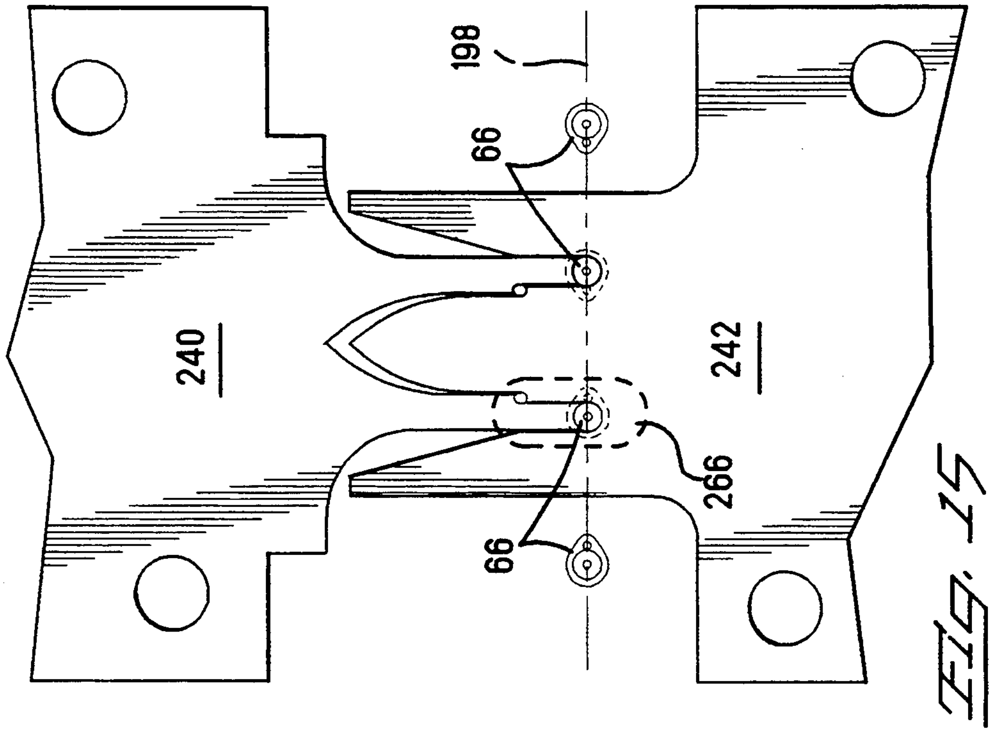
FIG. 15 is a front view of the forming tooling in a fully engaged position.

There is shown in FIGS. 13, 14, and 15 apparatus for forming the drain wire to the desired shape. There are shown mating upper and lower forming tool 240 and 242 respectively. The forming tools are attached to the movable portions 244 and 246 of slides 248 and 250, the stationary portions of which are attached to the mounting plate 46, as best seen in FIG. 3. A pair of linear actuators 252 and 254 are attached to the mounting plate by suitable means and have their piston rods attached to extension blocks 256 and 258 which are attached to the forming tools. The forming tools 240 and 242 are arranged to engage two adjacent cables 66 and form their drain wires to the shape shown in FIG. 5. Preparatory to doing this the cables must be rotated until their drain wires are positioned in the plane of the centerline 198. This procedure will be explained below, however, for now assume that this has been done. In the present example the drain wires are positioned opposing each other as shown in FIGS. 13 and 1.4. The upper forming tool 240 includes a pair of cable supports 260 which have concave ends for engaging and steadying the cables during the forming operation. The width of each cable support 260 is slightly less than the diameter of the cable. The lower tool 242 includes two openings 262 sized to closely receive the cables 66 absent the drain wire 70. The openings are deep enough to provide a small amount of clearance for the cables when the upper and lower tools are fully seated. The lower tool includes two wire pickup shoulders 264 each having a radius similar to that of the drain wire 70 to aid in its capture as the tools engage. Please see FIG. 16 for an enlarged view of this area which is indicated as 266 in FIG. 15. Each cable support 260 includes a forming shoulder 268 having an opposing radius similar to that of the pickup shoulders 264. During the forming process, as best seen in FIG. 14, as the two forming tools begin to engage the cable 66, the two supports 260 contact the cables as the two pickup shoulders 264 just reach the drain wires 70 at the centerline 198. At this point the upper tool has stopped moving and remains stationary while the lower tool continues moving upwardly until the drain wire 70 is formed against the forming shoulder 268 as shown in FIG. 15. The forming tools are then withdrawn back to the position shown in FIG. 13 and the two opposing drain wires 70 have been formed to the shape shown in FIG. 5.

Figure 18:
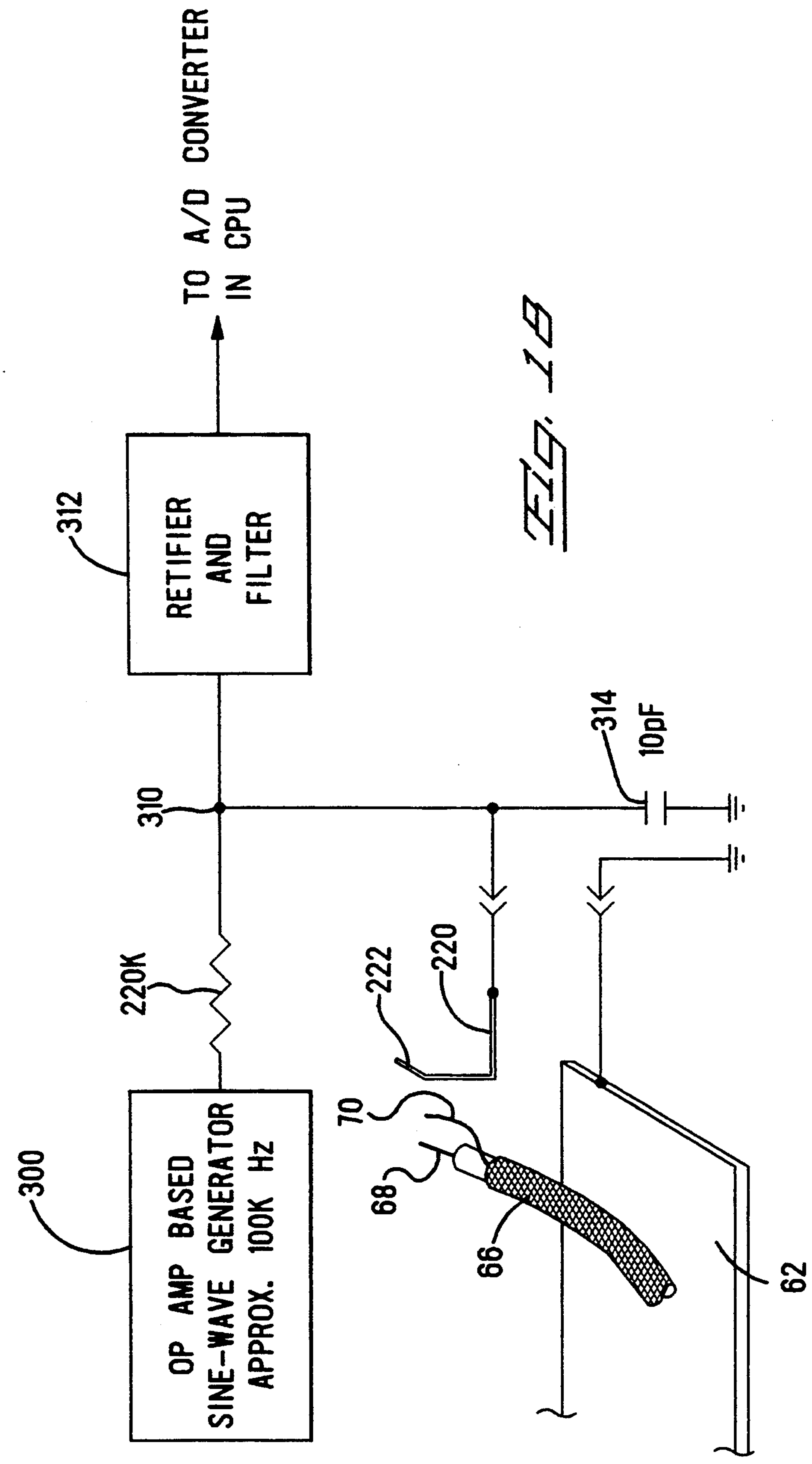
FIG. 18 is a schematic diagram showing the sensing circuit for sensing the drain wire.

The operation of the automated machine is controlled by a computer, not shown, in a manner that is well known in the art. However, the sensing of the drain wire by the sensing whisker should be described and is illustrated in FIG. 18 where there is shown a sign wave generator 300 for generating a 100K Hz signal that is passed to the sensor whisker 220 via the node 310. The node 310 is also connected to a 12 pF capacitor 314 which connects to ground and to a rectifier and filter 312, the output of which is directed to an analog to digital converter in the computer. The shielding of the cable 66 is in electrical contact with the plate 62 which is grounded. When the drain wire 70 contacts the sensor whisker 220, the 30 pF capacitance between the drain wire and the shielding will be in parallel with the 12 pF capacitor 314 causing the AC voltage at the node 310 to drop. This drop in voltage is then sensed by the computer.

In operation a plurality of cables 66 are placed in position in the cable holder 64. The carriage 40 is then advanced to the first pair of cables 66 by means of the stepper motor 20. The cylinder 202 and 234 are then. extended to bring the cable guides 240 and 242 into guiding engagement with the two selected cables. This also brings the cable rotating mechanism 120, into operational position as shown in FIGS. 3 and 10. The cylinder 200 is actuated to shift slide member left to position the center finger 194 against the first selected cable. The first dog 100 is raised by the cylinder 118 to release the selected cable for rotation. The rotating mechanism 120 is actuated by means of the stepper motor 186 to rotate the cable until the sensor 220 senses the drain wire in the plane of the centerline 198. The cylinder 118 is then extended to clamp the first cable in position. The slide member 136 is shifted right by means of the cylinder 200 to position the center finger 194 against the second selected cable. The second dog 100 is raised by the cylinder 116 to release the second selected cable for rotation. The rotating mechanism 120 is actuated by the stepper motor 186 to rotate the second cable until the sensor 220 senses the drain wire in the plane of the cable centerline 198. The cylinder 116 is then extended to clamp the second cable in position. A refinement in this process to rotate the cable unit the drain wire is in the plane of the cable centerline 198 is utilized in the present example. This includes continuing to rotate the cable after the drain wire after it is first sensed, in the same direction, until it is no longer sensed. Then rotate the cable in the opposite direction approximately one half the angular amount rotated since the drain wire was first sensed. This, depending on the exact characteristics of the mechanism, will place the drain wire very nearly in the desired position. The amount of back-rotation can be adjusted to compensate for variations from one cable product to another. Then the cylinder 200 is actuated to shift the slide member to its center position. The cylinders 252 and 254 are then extended to cause the form tooling to engage to form the two drain wires. These two cylinders are then retracted and the cylinder 200 is actuated to shift the slide member 136 to the right. The cylinder 116 then actuated to raise the dog 100 of the first cable and the cable rotation mechanism actuated to rotate the first cable until the drain wire is in its desired angular position for termination to a connector. The cylinder 116 then is extended to again clamp the first cable in position. The slide member 136 is then shifted to the left. The cylinder 118 is then retracted to raise the dog 100 of the second cable and the cable rotating mechanism 120 actuated to rotate the second cable until the drain wire is in its desired angular position for termination. The cylinder 118 is then extended to again clamp the second cable in position. The cylinders 202, 234, 252, and 254 are then retracted and the stepper motor 20 actuated to index the carriage to the next pair of cables and the above process repeated until all of the cables are processed. The cylinders 202, 234, 252, and 254 are then retracted thereby withdrawing all of the tooling from the cable centerline area and the carriage 40 is returned to its starting position by the stepper motor 20.

An important advantage of the present invention is that a tedious and time consuming manual process is automated resulting in substantial cost benefits as well as elimination of manually induced errors associated with the previous method.

We claim:

1. A method of positioning and forming a drain wire of a cable by means of an automated machine having:
   - a holder for receiving and holding at least one of said cables so that it can freely rotate about its axis;
   - clamping apparatus selectively operable to engage said cable thereby inhibiting said free rotation or to disengage said cable thereby permitting said free rotation thereof;
   - sensing means for sensing the presence of said wire when in a first predetermined position;
   - apparatus for rotating said cable about its axis, when said cable is free to rotate, until said drain wire is in said first predetermined position; and
   - apparatus for forming said drain wire into a desired shape and position with respect to said cable, said method comprising the steps:
   - (1) placing at least one cable in said holder;
   - (2) rotating said cable only until said sensing means senses the presence of said drain wire and said drain wire is in said first predetermined position; then
   - (3) forming a portion of said drain wire to a desired shape and position with respect to said cable.

2. The method according to claim 1 including after steps (3) the following step:
   - (4) additionally rotating said cable until said formed portion of said drain wire is in a second predetermined position.

3. The method according to claim 2 including operating said clamping apparatus to disengage only said cable prior to step (2) then engaging said cable immediately subsequent to step (2).

4. The method according to claim 1 wherein step (1) includes placing a plurality of cables in said holder and selecting a pair of said cables having a first cable and a second cable adjacent thereto, each said first and second cable having a drain wire, and wherein said rotation of step (2) includes rotating said first cable only until said sensing means senses the presence of said drain wire thereof and said drain wire is in its said first predetermined position, then rotating said second cable only until said sensing means senses the presence of said drain wire thereof and said drain wire is in its said first predetermined position.

5. The method according to claim 4 wherein said rotation of step (2) includes after said sensing means senses the presence of said drain wire of one of said first and second cables continuing to rotate said one cable in the same direction until said sensing means no longer senses the presence of said drain wire, then rotating said one cable in the opposite direction a determined amount.

6. The method according to claim 5 wherein step (b 3) includes concurrently forming a portion of each of the drain wires of said first and second cables to desired shapes and positions with respect to their respective cables.

7. The method according to claim 6 including after step (3) the following step;

(4) additionally rotting said one of said first and second cables until the formed portion of its drain wire is in a third predetermined position.

8. The method according to claim 7 including in step (2) prior to said rotating of said first cable, operating said clamping apparatus to disengage only said first cable, then after said rotating, operating said clamping apparatus to engage said first cable, then prior to said rotating of said second cable, operating said clamping apparatus to disengage only said second cable, then after said rotating, operating said clamping apparatus to engage said second cable.

9. The method according to claim 8 including in step (3) prior to said rotating of said first cable, operating said clamping apparatus to disengage only said first cable, then after said rotating, operating said clamping apparatus to engage said first cable, then prior to said rotating of said second cable, operating said clamping apparatus to disengage only said second cable, then after said rotating, operating said clamping means to engage said second cable.

10. The method according to claim 6 including selecting another pair of cables from said plurality of cables, excluding all cables that were previously processed, then repeating steps (2), (3), and (4), wherein said selecting another pair of said repeating steps (2), (3), and (4), continues until all cables of said plurality of cables are processed.

11. An automated machine for positioning and forming a drain wire of a cable comprising:

(1) a holder attached to said machine for receiving and holding a plurality of cables substantially in a first plane so that each said cable can freely rotate about its axis;

(2) clamping apparatus associated with said holder and selectively operable to engage a selected cable thereby inhibiting said free rotation thereof or to disengage said selected cable thereby permitting said free rotation thereof;

(3) a sensor attached to said machine adjacent said selected cable and arranged for sensing the angular position of the drain wire or said selected cable with respect thereto;

(4) apparatus attached to said machine and arranged in cooperation with said clamping apparatus and said sensor for rotating said selected cable about its axis, when said clamping apparatus has disengaged said selected cable and said cable is free to rotate, until said drain wire is sensed by said sensing means to be in a first predetermined position; and (5) apparatus coupled to said machine for engaging said drain wire in said first predetermined position and forming it and positioning it with respect to said selected cable, wherein said clamping apparatus is engaged with said selected cable except when said cable is being rotated by said apparatus for rotating.

12. The machine according to claim 11 wherein said apparatus for rotating said selected cable comprises:

(1) a housing coupled to said machine;

(1) first and second members arranged side by side within said housing for substantially parallel, inversely reciprocating motion with respect to said housing toward and away from said first plane;

(3) means arranged in said housing in engagement with said first and second members for effecting said reciprocating motion, wherein each member includes a finger projecting through said first plane and in proximity to said selected cable and said second member being operable to move toward said first member thereby causing its finger to engage said selected cable and urge it against the finger of said first member, so that when said means effects said reciprocating motion said selected cable is caused to rotate.

13. The machine according to claim 12 wherein said means for effecting said reciprocating motion is a cam arranged for rotation in said housing.

14. The machine according to claim 13 in including a third member arranged side by side with said second member within said housing for substantially parallel, inversely reciprocating motion with respect to said housing toward and away from said first plane, said third member being adjacent a side of said second member opposite said first member, wherein said third member includes a finger projecting through said first plane and in proximity to a second selected cable, said second member being operable to move away from said first member and toward said third member thereby causing its finger to engage said second selected cable and urge it against said finger of said third member, so that when said cam effects said reciprocating motion said second selected cable is caused to rotate.

15. The machine according to claim 14 including resilient means coupled to said housing for urging said first, second, and third members in engagement with said cam.

16. The machine according to claim 15 including means for selectively positioning said housing within said machine to either a first position where said fingers of said members project into and through said first plane in position for rotating said selected cable or a second position where said fingers are withdrawn from said first plane.

17. The machine according to claim 11 including a pair of guide members coupled to said machine adjacent said apparatus for forming and positioning said drain wire and arranged in a first position to cooperate in guiding said selected cable during said rotating thereof, said guide members being operable from said first position to a second position withdrawn from said first plane, wherein said sensor is an electrical conductor on one of said guide members which makes electrical contact with said drain wire when said drain wire is in said predetermined position, wherein said pair of guide members is arranged so that one of said guide members is on one side of said first plane and the other guide member is on the other side thereof when in said second position, and wherein said guide members overlap forming an opening through which said selected cable extends when in said first position.

18. The machine according to claim 11 wherein said clamping apparatus comprises:

a first strip of resilient material adjacent said holder and in light contact with each of said plurality of cables to that each said cable is sandwiched between said holder and said first strip; and a plurality of clamping members coupled to said clamping apparatus adjacent said first strip, each one of which is associated with one of said plurality of cables so that said first strip is between each said clamping member and its associated cable, wherein each said clamping member is movable toward its respective associated cable to cause a portion of said first strip to engage and to press said associated cable against said holder thereby inhibiting said free rotation thereof and is further movable away from said first strip thereby permitting said free rotation thereof.

19. In an automated machine for positioning and forming a drain wire of a cable, including a holder attached to said machine for receiving and holding a plurality of cables so that each said cable can freely rotate about its axis, a clamping apparatus associated with said holder selectively operable to engage a selected cable thereby inhibiting said cable from said rotation or to disengage said selected cable thereby permitting said rotation, comprising:

a first strip of resilient material adjacent said holder and in close proximity with each of said plurality of cables so that each said cable is sandwiched between said holder and said first strip; and a plurality of clamping members adjacent said first strip, each one of which is associated with one of said plurality of cables so that said first strip is between each said clamping member and its associated cable, wherein each said clamping member is movable toward is respective associated cable and into pressing engagement with said first strip to cause a portion of said first strip to engage and to press said associated cable against said holder thereby inhibiting said free rotation thereof.

20. The machine according to claim 19 wherein each of said clamping members is pivotally attached at one end thereof to a clamping bar that is spaced from and is substantially parallel with said holder.

21. The machine according to claim 20 including a second strip of resilient material disposed in between said clamping members and said clamping bar thereby urging said clamping members into said pressing engagement with said first strip.

22. The machine according to claim 21 wherein each of said clamping members includes a dog on the end opposite the end of pivotal attachment, and said machine including an actuating means attached thereto and operable for engaging a dog of a selected clamping member and pivoting said selected clamping member to cause a portion of said first strip to engage and to press the cable associated with said selected clamping member against said holder.

* * * * *

UNITED STATES PATENT AND TRADEMARK OFFICE

CERTIFICATE OF CORRECTION

PATENT NO. : 5,367,767

DATED : November 29, 1994

INVENTOR(S) : Gregory F. Deuel; Kenneth F. Folk

It is certified that error appears in the above-indentified patent and that said Letters Patent is hereby corrected as shown below:

In the Claims:

Claim 7, Column 9, line 3 - "rotting" should be --rotating--

Claim 10, Column 9, Line 5 - "of" should be --and--

Claim 10, Column 9, Line 5 - "(4)," should be --(4)--

Claim 11(3), Col. 9, line 14, "cr" should be --of--

Claim 12, Column 9, Line 4 - "(1)" should be --2--

Claim 14, Column 10, Line 1 - "in including" should be --including--

Claim 18, Column 10, Line 5 - "to" should be --so--

Signed and Sealed this

Fourth Day of April, 1995

Attest:

BRUCE LEHMAN

Attesting Officer

Commissioner of Patents and Trademarks